US010062257B2

(12) United States Patent
Chau

(10) Patent No.: US 10,062,257 B2
(45) Date of Patent: Aug. 28, 2018

(54) INTELLIGENT DISPLAY SYSTEM AND METHOD

(71) Applicant: Shenzhen Wale Intelligent System Limited, Shenzhen, Guangdong (CN)

(72) Inventor: Ching Ho Chau, Hong Kong (HK)

(73) Assignee: Shenzhen Wale Intelligent System Limited, Shenzhen (CN)

(*) Notice: Subject to any disclaimer, the term of this patent is extended or adjusted under 35 U.S.C. 154(b) by 0 days.

(21) Appl. No.: 15/287,753

(22) Filed: Oct. 7, 2016

(65) Prior Publication Data

US 2017/0103629 A1 Apr. 13, 2017

Related U.S. Application Data

(60) Provisional application No. 62/239,255, filed on Oct. 8, 2015.

(30) Foreign Application Priority Data

Sep. 21, 2016 (CN) .......................... 2016 1 0838249

(51) Int. Cl.
*G06K 7/00* (2006.01)
*G07C 9/00* (2006.01)
(Continued)

(52) U.S. Cl.
CPC ......... *G08B 13/246* (2013.01); *G06K 7/0004* (2013.01); *G06K 7/10237* (2013.01);
(Continued)

(58) Field of Classification Search
CPC .... B25H 3/00; G06Q 10/087; G07C 9/00896; G07C 9/00912; G07C 2009/00912;
(Continued)

(56) References Cited

U.S. PATENT DOCUMENTS

2010/0187307 A1* 7/2010 Phillips .............. G06K 7/10316
235/385
2011/0074543 A1 3/2011 Kaczmarz et al.
(Continued)

FOREIGN PATENT DOCUMENTS

CN 201917955 U 8/2011
CN 203179157 U 9/2013

OTHER PUBLICATIONS

Combined Search and Examination Report of counterpart British Patent Application No. 1617066.4 dated Mar. 29, 2017.

*Primary Examiner* — Dionne H Pendleton

(57) ABSTRACT

An intelligent display system and method is disclosed. The intelligent display system at least includes an intelligent display cabinet and a server connected with the intelligent display cabinet; the intelligent display cabinet including a plurality of shelf units for placing therein display products, each of the shelf units including: a control module connected with the server; a product-sensing module connected with the control module for sensing the putting in and taking out of the display products and obtaining information on the display products; an electronic lock connected with the control module for opening or closing of a cabinet door of each shelf unit according to a command of the control module; and a display screen provided on the cabinet door of each shelf unit and connected with the control module. The intelligent display cabinet can realize unattended store, satisfy user's experience, and lower running cost.

20 Claims, 9 Drawing Sheets

(51) Int. Cl.
*G08B 13/24* (2006.01)
*G07F 11/62* (2006.01)
*G06K 7/10* (2006.01)
*G08B 21/24* (2006.01)
*H04B 5/00* (2006.01)

(52) U.S. Cl.
CPC ..... *G07C 9/00023* (2013.01); *G07C 9/00071* (2013.01); *G07C 9/00563* (2013.01); *G07C 9/00571* (2013.01); *G07C 9/00912* (2013.01); *G07F 11/62* (2013.01); *G08B 21/24* (2013.01); *H04B 5/0062* (2013.01)

(58) Field of Classification Search
CPC .. G07C 2009/0092; G07C 2009/00936; G07F 11/36; G07F 11/62; G07F 11/64; H01R 13/6683; H01R 4/48; H01R 4/66; H04L 41/20; H04L 41/24; H04Q 1/026; H05K 7/1498; G06K 7/0004; G06K 7/10237; G06K 7/10356; G06K 7/10336; G06K 7/10425; G06K 7/10415; G08B 13/246; G08B 13/2454; H04B 5/0062
See application file for complete search history.

(56) References Cited

U.S. PATENT DOCUMENTS

| | | | |
|---|---|---|---|
| 2012/0133510 A1* | 5/2012 | Pierce | H04Q 1/026 340/540 |
| 2015/0058163 A1 | 2/2015 | Lenahan et al. | |
| 2015/0379366 A1* | 12/2015 | Nomura | G06Q 50/28 382/203 |
| 2017/0217011 A1* | 8/2017 | Savage | B25H 3/00 |
| 2017/0372555 A1* | 12/2017 | Clark | G07F 11/62 |

\* cited by examiner

INTELLIGENT DISPLAY SYSTEM AND METHOD

CROSS-REFERENCE TO RELATED APPLICATIONS

This application claims the benefit of Chinese patent application No. 201610838249.9 filed on Sep. 21, 2016 which claims the benefit of U.S. Provisional Patent Application No. 62/239,255, filed on Oct. 8, 2015, the entire content of which is hereby incorporated by reference.

FIELD OF THE TECHNOLOGY

The present application relates to the field of goods display and sale technology, and particular to an intelligent display system and method.

BACKGROUND

Development of science and technology promotes social changes, and is also changing people's living habit. Shopping is an absolutely necessary activity in people's life. Each consumer is concerned about how to quickly and efficiently buy high quality and inexpensive goods that he or she wishes. There are two main shopping patterns:
1) Store shopping (purchase in physical store) pattern: complete on the spot experience, transaction and pickup of goods in physical store.
2) Online shopping (purchase online) pattern: search and order goods online, and online dealer forwards the goods to the purchaser by mail or express.

In view of the development of internet technology and the change in people's concept, online shopping is accepted by the majority, and becomes a shopping activity that cannot be neglected. Hence, O2O (Online to Offline) mode emerges as the times require, and becomes a "new beloved" of brand merchandisers and consumers. However, this consuming pattern has some drawbacks. For example, you cannot believe what you see online. Also, some online sellers are good and some are bad. This shakes the confidence of the consumers. In another aspect, due to the impact of online shopping, the traditional store shopping pattern is in crisis. Because of the factors such as increase in the cost of staff, continuous increase of rent, and sell price is higher than that of online shopping, it makes running of a physical store difficult. Clever consumers will take advantage of the advantages of store shopping and online shopping. They will first search online, go to a physical store for experience, and finally make the purchase online. This makes some of the physical stores become empty shells and difficult to carry on business. Facing these challenges, some brands/companies simply change their physical stores to experience stores to please this group of consumers. This is the formation of the new O2O pattern, i.e. O2O2O (Online to Offline to Online). However, a lot of manpower and material resources need to be invested in these experience stores. Also, consumers need to go to the experience store before knowing whether the goods they are interested in are in that store or not. The unpredictability and lack of clarity of information can make consumers confused.

In today's world, Internet Plus, Internet of Things, Industry 4.0, intelligent community, smart city, big data, cloud technology are unstoppable. The establishing of these systems is inseparable from data collection, data communication, data analysis, and intelligent decision making. In online shopping or O2O mode, consumers need to quickly find the goods they need, and brand merchandisers (dealers) need to promptly obtain consumers' shopping and experience data, analyze the data, and promptly adjust the goods and the layout of the experience store in order to promote sale of goods.

Radio-frequency identification (RFID) technology is a contactless automatic recognition technology. It automatically recognizes the target by radio-frequency signal and obtains related data. The recognition process does not need to be manually intervened. As the Internet of Things (IoT) concept is more and more acceptable, and its application is more and more extensive, RFID plays a more and more important role. RFID is one of the most effective ways of intelligent data collection, and is widely used in the area of data collection.

If Internet of Things can be combined with O2O, it will make display and sale of goods become more intelligent.

SUMMARY

An object of the present application is to provide an intelligent display system and method.

In an aspect, the present application provides an intelligent display system, at least including an intelligent display cabinet and a server connected with the intelligent display cabinet; the intelligent display cabinet including a plurality of shelf units for placing therein display products, each of the shelf units including: a control module connected with the server; a product-sensing module connected with the control module for sensing the putting in and taking out of the display products and obtaining information on the display products; an electronic lock connected with the control module for opening or closing of a cabinet door of each shelf unit according to a command of the control module; and a display screen provided on the cabinet door of each shelf unit and connected with the control module.

In an embodiment, the product-sensing module may be an electronic label reader, camera, or barcode recognition device.

In an embodiment, the electronic label reader may be a radio frequency identification (RFID) reader.

In an embodiment, the display screen may include a touch display screen.

In an embodiment, the shelf unit further may include a user recognition module which is connected with the control module.

In an embodiment, the user recognition module may be a near field communication (NFC) reader.

In an embodiment, the shelf unit further may include an input device provided on the cabinet door, the input device being connected with the control module.

In an embodiment, the input device may be a barcode recognition device, fingerprint recognition device or keyboard.

In an embodiment, the control module may be a circuit board provided with a microcontroller or microprocessor.

In an embodiment, the user recognition module may be a NFC label.

In another aspect, the present application provides an intelligent display method, including: obtaining information on a display product put into a shelf unit by a control module of the shelf unit of an intelligent display cabinet through a product-sensing module; sending information on the display product and information on the corresponding shelf unit to a server by the control module; linking together the information on the display product and the information on the corresponding shelf unit by the server, and marking the status of the display product as online; displaying the information on the display product on a display screen of the shelf unit; carrying out verification of identity information of a user when the server receives a request for experience transmitted from the user; controlling an electronic lock of the shelf unit and opening of a cabinet door of the shelf unit by the control module after verification of the identity information of the user; and controlling the electronic lock of the shelf unit and closing of the cabinet door of the shelf unit by the control module, after the product-sensing module of the shelf unit senses that the display product is put back in the shelf unit.

In an embodiment, after verification of the identity information of the user, the opening of the cabinet door of the shelf unit by the electronic lock of the shelf unit may include: marking the status of the display product as offline by the server, after the product-sensing module of the shelf unit senses that the display product is taken out from the shelf unit.

In an embodiment, after the product-sensing module of the shelf unit senses that the display product is put back into the shelf unit, the closing of the cabinet door of the shelf unit by the electronic lock of the shelf unit may include: determining whether the display product put back into the shelf unit is the same as the display product taken out earlier; if it is the same, the electronic lock of the shelf unit closes the cabinet door of the shelf unit, and the server marks the status of the display product as online; and if it is not the same, then the shelf unit or the server sends a reminder to the user to remind the user to put the display product back in the shelf unit.

In an embodiment, the product-sensing module may be an electronic label reader, camera, or barcode recognition device.

In an embodiment, the product-sensing module may be a RFID reader, and a RFID label is provided on the display product.

In an embodiment, when the server receives the request for experience transmitted from the user, verification of the identity information of the user may include: providing a user recognition module on the shelf unit, the user recognition module being a NFC reader, and transmitting the request for experience from the user to the server by bringing an intelligent terminal with NFC function close to and read by the NFC reader.

In an embodiment, when the server receives the request for experience transmitted from the user, verification of the identity information of the user may include: transmitting the request for experience from the user to the server by scanning a recognition code displayed on the display screen through the use of an intelligent terminal.

In an embodiment, after the identity information of the user passes the verification, the opening of the cabinet door of the shelf unit by the electronic lock of the shelf unit may include: after the identity information of the user passes the verification, reverting a verification code to an intelligent terminal of the user by the server, and rendering the electronic lock to open the cabinet door of the shelf unit through entering the verification code into the shelf unit by the user.

In an embodiment, the information on the shelf unit at least may include geographic location information.

In an embodiment, when the server receives the request for experience transmitted from the user, verification of the identity information of the user may include: providing a user recognition module on the shelf unit, the user recognition module being a NFC label, and transmitting the request for experience from the user to the server by bringing an intelligent terminal with NFC function close to and read the NFC label.

The intelligent display system and method of the present application have the following beneficial effects. The intelligent display system and method of the present application can allow consumers to search the information on a product of interest in real time, and find a nearby intelligent display cabinet to carry out experiencing of the product. The intelligent display cabinet can realize unattended store, satisfy user's experience, and lower running cost.

BRIEF DESCRIPTION OF THE DRAWINGS

Specific embodiments will now be described by way of example with reference to the accompanying drawings wherein.

DETAILED DESCRIPTION

Figure 1:
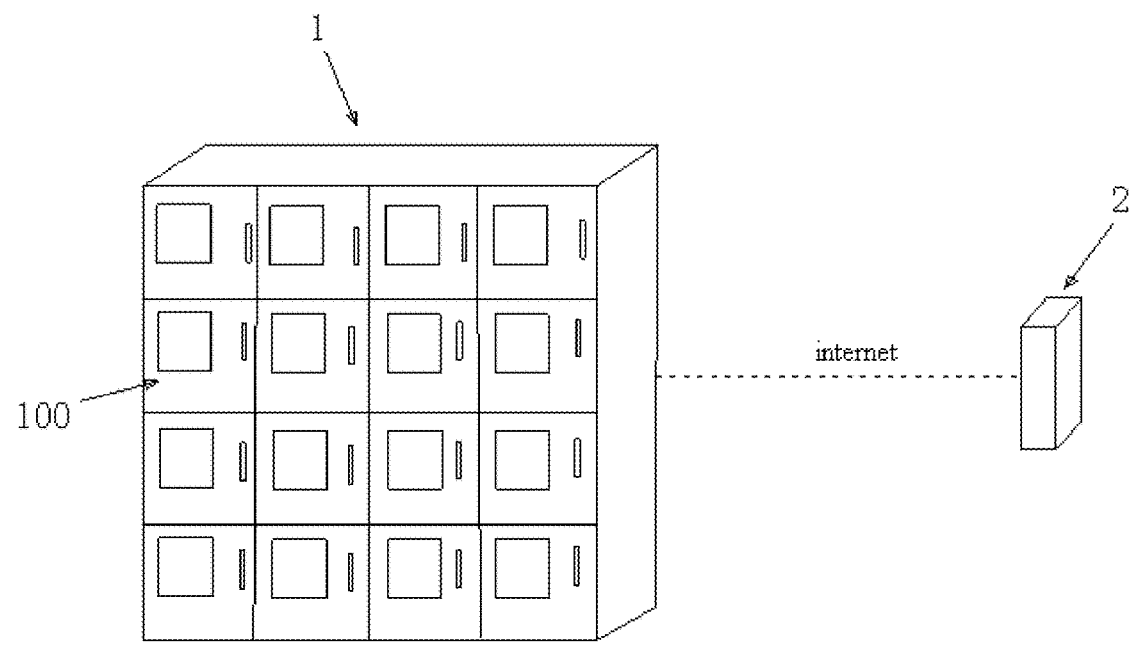
FIG. 1 is an illustrative diagram of an embodiment of the intelligent display system of the present application.

To have a clear understanding of the technical features, objects and effects of the intelligent display system and method of the present application, specific embodiments will now be described in detail with reference to the accompanying drawings.

Embodiments of the intelligent display system and method of the present application are described below in detail. These embodiments are shown in the accompanying drawings Like reference numerals representing like parts with like functions are used throughout the drawings.

FIG. 1 shows an illustrative diagram of an embodiment of the intelligent display system of the present application. In the embodiment, the intelligent display system may at least include an intelligent display cabinet 1 and a server 2 connected with the intelligent display cabinet 1. There may be a plurality of intelligent display cabinets 1 provided in a number of places. For example, they may be distributed in different experience stores. The intelligent display cabinet 1 may access the internet by means of wire or wireless, and may connect with the server 2 through the internet. The server 2 can be a cloud server.

Figure 2:
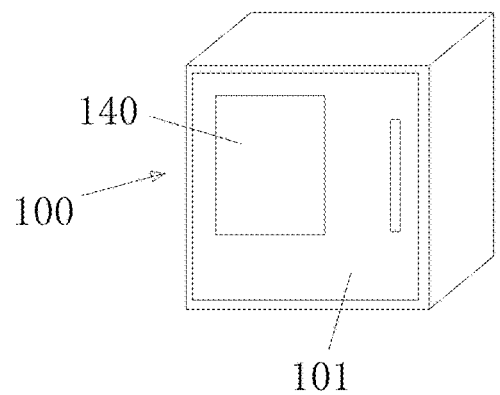
FIG. 2 is a perspective view of a shelf unit of an intelligent display cabinet of the intelligent display system in FIG. 1.
Figure 3:
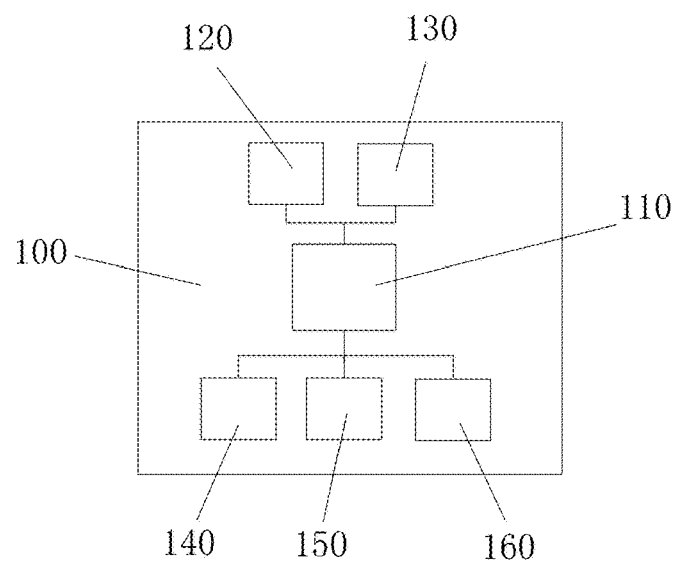
FIG. 3 is a block diagram showing the function of the shelf unit in FIG. 2.

Referring to FIG. 2 and FIG. 3, each intelligent display cabinet 1 may include a certain number of shelf units 100 for placing therein a number of display products. The number and size of the shelf units 100 may be determined according to the number and size of the display products. Each shelf unit 100 may include a control module 110. Product-sensing module 120, electronic lock 130, display screen 140, user recognition module 150 and input device 160 can be respectively connected with the control module 110. The control module 110 may be a circuit board carrying a microcontroller or microprocessor and having a certain information processing capacity. The product-sensing module 120 can be used to sense the putting in and taking out of the display products, and obtain information on the display products. The product-sensing module 120 can be an electronic label reader, camera, barcode recognition device, or other recognition device. Accordingly, putting in and taking out of a display product can be sensed by reading an electronic label on the display product, by capturing and recognizing the display product by a camera, by recognizing a barcode on the display product, or by other recognizing method. In the present embodiment, the product-sensing module 120 can be a RFID reader, which can sense the putting in and taking out of the display product by sensing the RFID label on the display product, and obtain information on the display product by reading the RFID label. The electronic lock 130 can be used to open or close a cabinet door 101 of each shelf unit 100 according to a command of the control module. The display screen 140 may be provided on the cabinet door 101 of each shelf unit 100 for displaying information such as information on the display products, information on the shelf unit 100, etc. The display screen 140 can be a touch display screen. In this way, operation can be carried out by touching the screen. The user recognition module 150 may be used to recognize information on the user. In the present embodiment, the user recognition module 150 is a near field communication (NFC) reader, which can carry out recognition of a user by reading the information on the user's intelligent terminal with NFC function. The user recognition module 150 can also be a NFC label. The user can transmit a request for experience to the server by bringing the intelligent terminal with NFC function close to and read the NFC label, and the server carries out recognition of the user. The input device 160 can be a barcode recognition device, small keyboard, or fingerprint recognition device, etc. Information such as a verification code can be entered through the input device. It should be understood that the user recognition module 150 and the input device 160 may not be necessary. Verification of identity can also be carried out by using the user's intelligent terminal to scan QR code information on the display screen 140 in order to transmit the information to the server.

The present application also provides an intelligent display method. Carrying out of the intelligent display method using the above-mentioned intelligent display system may include the following steps:

Step S1: The control module of the shelf unit of the intelligent display cabinet obtains information on the display product put in the shelf unit through the product-sensing module;

Step S2: The control module transmits information on the display product and information on the corresponding shelf unit to the server;

Step S3: The server correlates the information on the display product and information on the corresponding shelf unit, and marks the status of the display product as online;

Step S4: The display screen on the shelf unit displays information on the display product;

Step S5: When the server receives a request for experience from a user, it carries out verification of the user's identity;

Step S6: after the user's identity information passes the verification, the electronic lock of the shelf unit opens the cabinet door of the shelf unit; and Step S7: After the product-sensing module of the shelf unit senses the putting back of the display product in the shelf unit, the electronic lock of the shelf unit closes the cabinet door of the shelf unit.

Step S6 may further include:
  after the product-sensing module of the shelf unit senses the taking out of the display product from the shelf unit, the server marks the status of the display goods as offline.

Step S7 may further include:
  determining whether the display product put back in the shelf unit is the same as the display product taken out earlier,
  if it is the same, the electronic lock of the shelf unit closes the cabinet door of the shelf unit, and the server marks the status of the display product as online; and
  if it is not the same, then the shelf unit or the server sends a reminder to the user to remind the user to put the display product back in the shelf unit.

Step S5 may further include:
  providing a user recognition module on the shelf unit, the user recognition module being a NFC reader, and transmitting a request for experience from the user to the server by bringing an intelligent terminal with NFC function close to and read by the NFC reader.

Step S5 may further include:
  transmitting a request for experience from the user to the server by scanning a recognition code displayed on the display screen through the use of an intelligent terminal.

Step S5 may further include:
  providing a user recognition module on the shelf unit, the user recognition module being a NFC label, and transmitting a request for experience from the user to the server by bringing an intelligent terminal with NFC function close to and read the NFC label.

Step S6 may further include:
  after the identity information of the user passes the verification, reverting a verification code to the user's intelligent terminal by the server, and rendering the electronic lock to open the cabinet door of the shelf unit through entering of the verification code into the shelf unit by the user.

In the intelligent display method, the information on the shelf unit may at least include geographic location information. After the server has correlated the information on the display product and the information on the shelf unit, and the user is searching for the display product through an intelligent terminal or computer terminal, the geographic location of the shelf unit that stores the display product will be displayed to facilitate the user to have nearby experience of display products.

Figure 4:
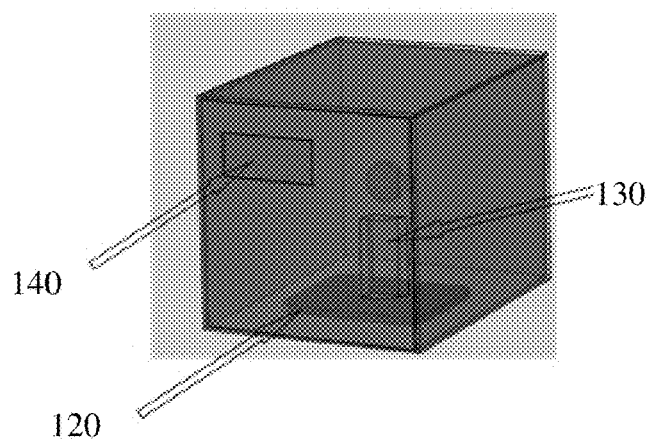
FIG. 4 is a perspective view of another embodiment of the shelf unit of the intelligent display system of the present application.
Figure 5:
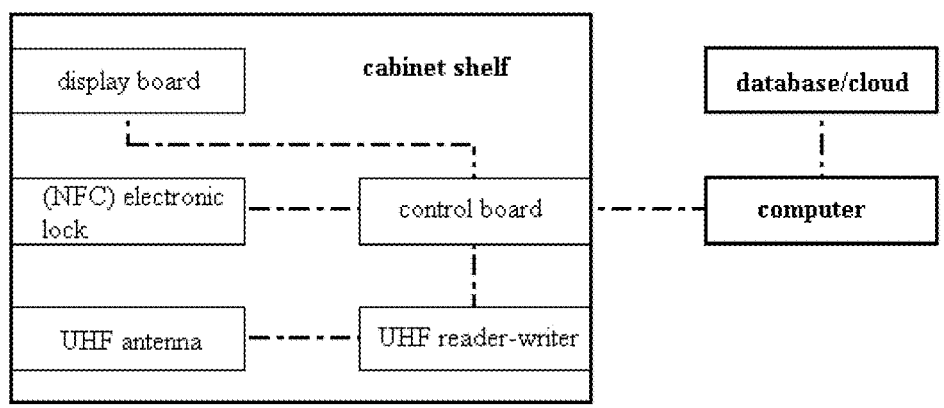
FIG. 5 is a block diagram showing the function of the shelf unit in FIG. 4.

FIGS. 4 and 5 are illustrative diagrams of another embodiment of the shelf unit of the intelligent display cabinet of the present application. The intelligent display cabinet of the embodiment can be a RFID intelligent display cabinet. The intelligent display cabinet may be composed of a certain number of shelf units. Each shelf unit may be provided with a display board 140, (NFC) intelligent electronic lock 130, RFID (e.g. ultra high frequency (UHF)) antenna 120, control board 110, etc. These components may be connected with RFID (e.g. UHF) reader-writer, computer and database/cloud in real time for online data transmission and automatic control so as to realize self-serve style intelligent management.

The RFID intelligent display system of the embodiment may mainly include: database/cloud system, website/APP system and intelligent cabinet/self-serve experience store (intelligent store) system.

The main elements involved in the embodiment of the RFID intelligent display system may include:
1) Product information storage/database
2) Display product with embedded RFID label
3) RFID intelligent cabinet
4) Consumer's intelligent mobile terminal (cell phone) and APP
5) Internet communication equipment The embodiment of the RFID intelligent display system may have three advantages:
1) Real time, complete, visualized product information;
2) Intelligent, interactive, monitorable product cabinet; and
3) Self-serve, convenient, mobile experience store.

Figure 6:
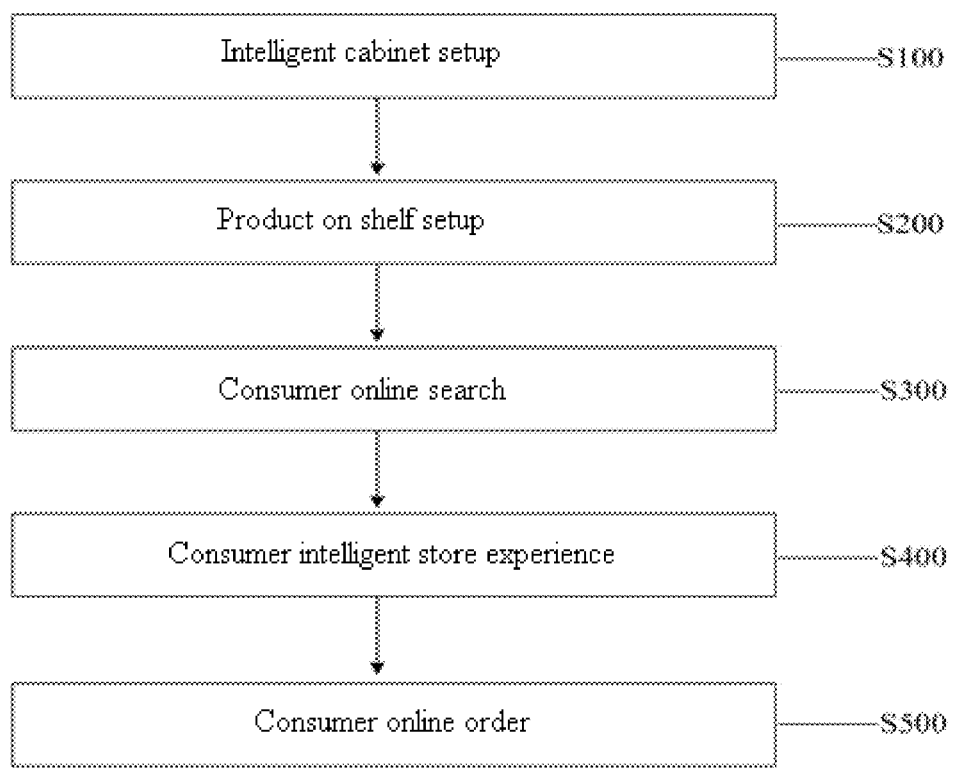
FIG. 6 is a main flowchart of another embodiment of the intelligent display process of the intelligent display system of the present application.

FIG. 6 is a main flowchart of an intelligent display method based on RFID intelligent display cabinet, which may include:

Step S100: Setup of intelligent cabinet. Products can be put on shelf after the intelligent cabinet is set up;

Step S200: setup of product on shelf. The goods on the intelligent shelf can be changed any time through setup of product on shelf, thereby displaying product information online and at the experience store in real time;

Step S300: consumer online search. Consumer can targetedly search the goods of interest;

Step S400: consumer intelligent store experience. Consumer can go to a nearby target experience store, self-serve and experience the goods after the target goods are located;

Step S500: consumer online purchase. Consumer can instantly order by cell phone or purchase online afterwards after satisfied experience with the goods.

Figure 7:
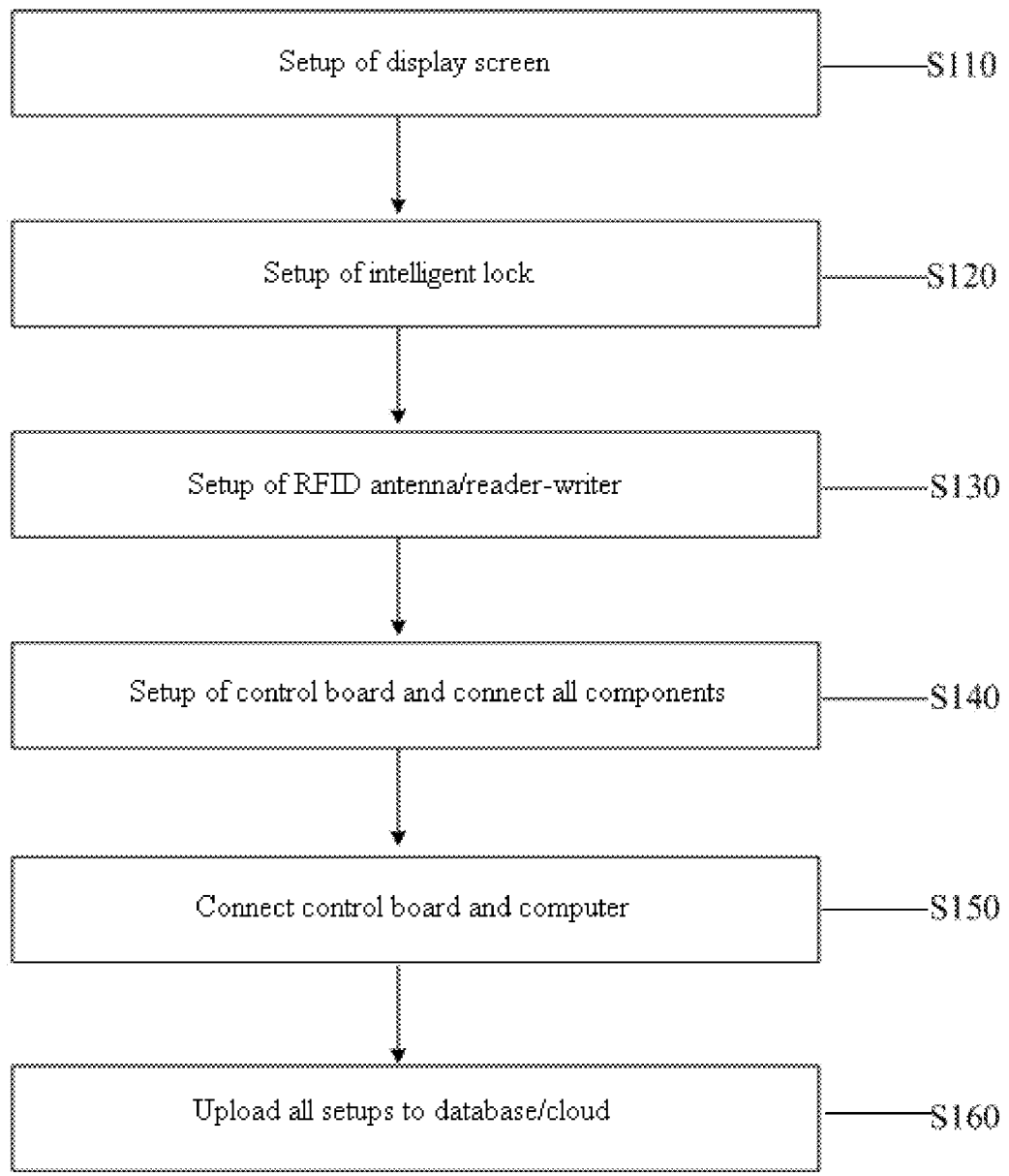
FIG. 7 is a flowchart of step S100 of the process in FIG. 6.

FIG. 7 is a flowchart of the setup of intelligent cabinet in step S100 of the process in FIG. 6, which may include:

Step S110: setup display screen;
Step S120: setup intelligent lock;
Step S130: setup RFID antenna/reader-writer
Step S140: setup control board and connection with all components;
Step S150: connection of control board and computer;
Step S160: upload all setups to database/cloud;

According to this process, the display screen, intelligent lock, RFID antenna/reader-writer can be set up in order, and the display screen, intelligent lock, RFID antenna/reader-writer can be correlated to the control board. After the intelligent shelf is set, the control board can be connected with the computer, and all the setups can be transmitted to the background database/cloud. Goods can be "loaded" any time after the frame of the intelligent display system is built.

Figure 8:
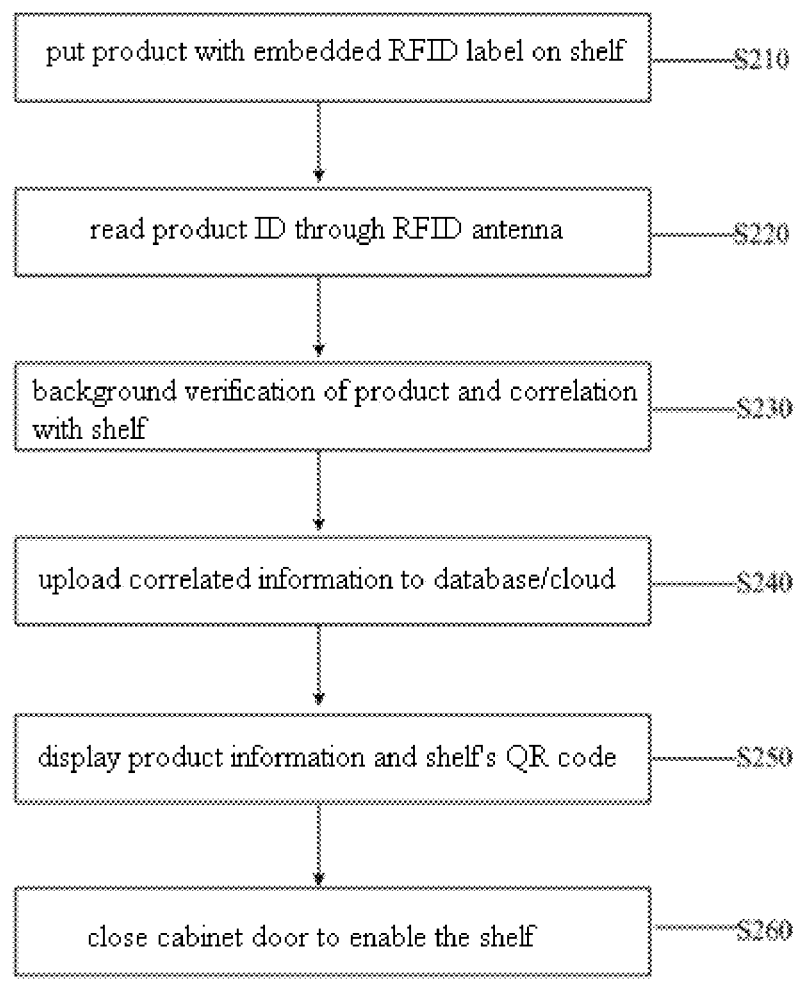
FIG. 8 is a flowchart of step S200 of the process in FIG. 6.

FIG. 8 is a flowchart of the setup of product on shelf in step S200 of the process in FIG. 6, which may include:

Step S210: placement of products embedded with RFID labels on shelf. After the intelligent store receives the display products embedded with RFIDs, the products can be put in selected shelves;

Step S220: read product identification (ID) through RFID antenna. The system can read the product ID number through the RFID antenna;

Step S230: background verification of product and correlation to shelf. After the product is verified by the system, the product is correlated to the shelf;

Step S240: upload correlated information to database/cloud. The correlated information is uploaded to the database/cloud;

Step S250: display product information and QR code on shelf. The system can display information on the product and the QR code of the shelf on the display screen.

Step S260: close cabinet door and shelf is enabled. After the cabinet door is closed (locked), consumers can search the product information and experience in the experience store.

Figure 9:
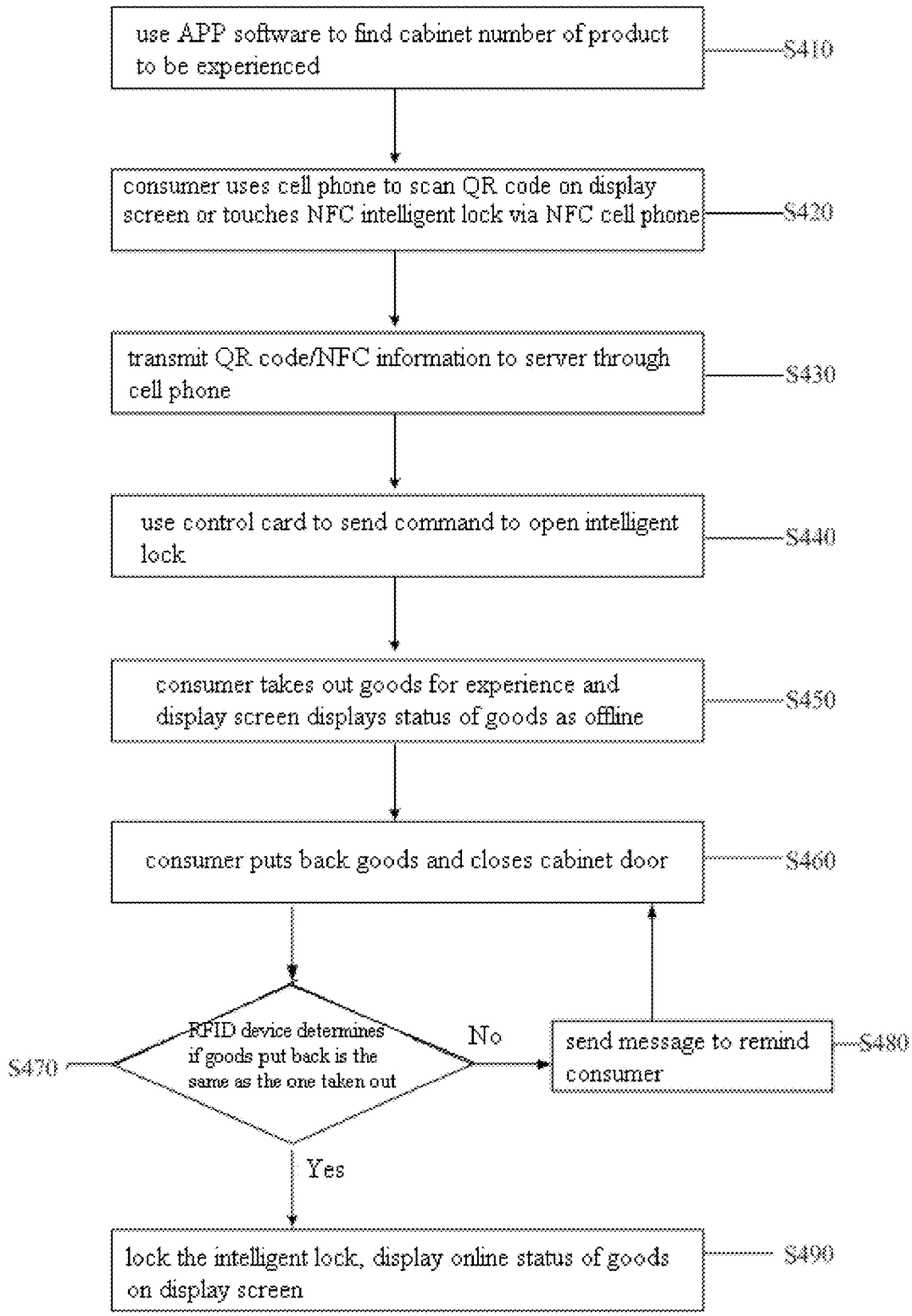
FIG. 9 is a flowchart of step S400 of the process in FIG. 6.

FIG. 9 is a flowchart of the consumer intelligent store experience in step S400 of the process in FIG. 6.

Step S410: use APP software to find shelf number of the product to be experienced. Consumers can search the intelligent store and shelf in which the product to be experienced through cell phone or computer;

Step S420: use cell phone to scan QR code on display screen or touch NFC intelligent lock by NFC cell phone. Consumers in the experience store can use intelligent mobile terminal to scan the QR code/NFC card on the screen of the shelf, or use NFC cell phone to touch the NFC intelligent lock (if NFC function is used, consumers can carry out virtual card-issuing through APP software, and can use this virtual NFC membership card to directly open the intelligent lock);

Step S430: transmission of QR code/NFC information to server through cell phone. The APP in the intelligent mobile terminal of the consumer can transmit the QR code/NFC information to the server;

Step S440: use of control card to send command to open intelligent lock. The system can open the intelligent lock through a control card;

Step S450: consumer takes out goods for experience and display screen displays offline status of goods. A consumer can self-serve and experience the product on the shelf. At this time, the online to offline (O2O) system will indicate that the status of the product is offline;

Step S460: consumer puts back product and closes cabinet door. After experiencing the product, the consumer puts the product back on the shelf and closes the door;

Step S470: RFID device determines if product put back is the same as the product taken out. At this time, the system automatically determines whether the product put back in the shelf by the consumer is the same as the product taken out earlier;

Step S480: send message to remind consumer. If the product is not the correct product, the system will send a message to remind the consumer, and will decline to lock the door;

Step S490: lock intelligent lock and display on display screen online status of goods. After the product put back on shelf is verified to be the correct one, the system will automatically lock the door. At this time, the online to offline system will indicate the status of the product as online, and the consumer can leave the intelligent store.

It should be realized that, steps S420-S430 can be carried out through the reading of the user's NFC terminal card, and the electronic lock can be opened using verification method such as host card emulation (HCE), etc.

When a consumer is carrying out self-serve experience, the system will automatically record the experience activity and related data for the brand merchandiser to analyze and carry out sale comparison.

Figure 10:
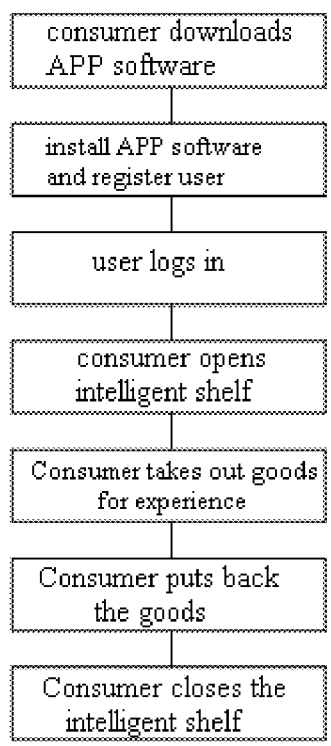
FIG. 10 is a flowchart of the use of the intelligent display cabinet by a consumer.

FIG. 10 is a flowchart of the use of the intelligent display cabinet by a consumer, which may include:

Consumer downloads APP software. For example, consumer can download APP software through QR code on website or in intelligent store;

APP software installation and user registration. The consumer can install APP software and register on the intelligent terminal;

User logs in. The consumer can log in on the intelligent terminal;

Consumer opens intelligent cabinet. The consumer can open the intelligent shelf by scanning the QR code on the display screen with an intelligent terminal or by using a NFC cell phone;

Consumer takes out goods for experience. The system will be informed of the time when the product is taken out and the consumer who takes the product out;

Consumer puts back the goods. The system will be informed as to whether the article is put back properly and a reminder will be sent;

Consumer closes the intelligent shelf. After the article is properly put back on the shelf, the system records the related information on this interaction.

The intelligent display system of the present application is a modernized managing and operating system, which is an integration of RFID, controller, intelligent mobile terminal, internet, Internet of Things, O2O, and intelligent experience/sale. The intelligent display system can allow consumers to search information of interested products in real time, targetedly go to a nearby experience store and use intelligent mobile terminal to self-serve and experience the product. This realizes unattended intelligent managing of a store. Brand merchandisers can automatically obtain consumers' experience data for analysis and adjust the layout of the experience store in real time and the production plan of the products. The intelligent display system inseparably links experience stores and online shopping together, and achieves real O2O mode of operation.

The intelligent display system closely links brand merchandisers, administrators, and consumers together on one platform. This allows them to perform their duties and get what they need, and results in transparency of information, self-serving experience, and intelligentized operation.

The intelligent display system of the present application can inseparably link together consumer, (NFC) intelligent cell phone, intelligent cabinet, display product embedded with RFID label, brand merchandiser, experience store, and online shopping such that merchandiser can monitor the activity of the product in the experience store, collect different consumers' purchase activities, obtain important information such as contribution of the experience store to the consumers' successful shopping. Also, consumer shopping has the characteristic of being foreseeable, experience-able, self-serve, intelligentized, and excellent in pricing. This can achieve a win-win situation for brand merchandisers and consumers, and experience a novel O2O mode. This new method inseparably, seamlessly and immediately links up information online and actual products in experience store. This makes an online store become a direct mapping of an intelligent store, and the intelligent store can be an actual extension of the online store information. This inevitably is another embodiment of the Internet of Thing concept.

Figure 11:
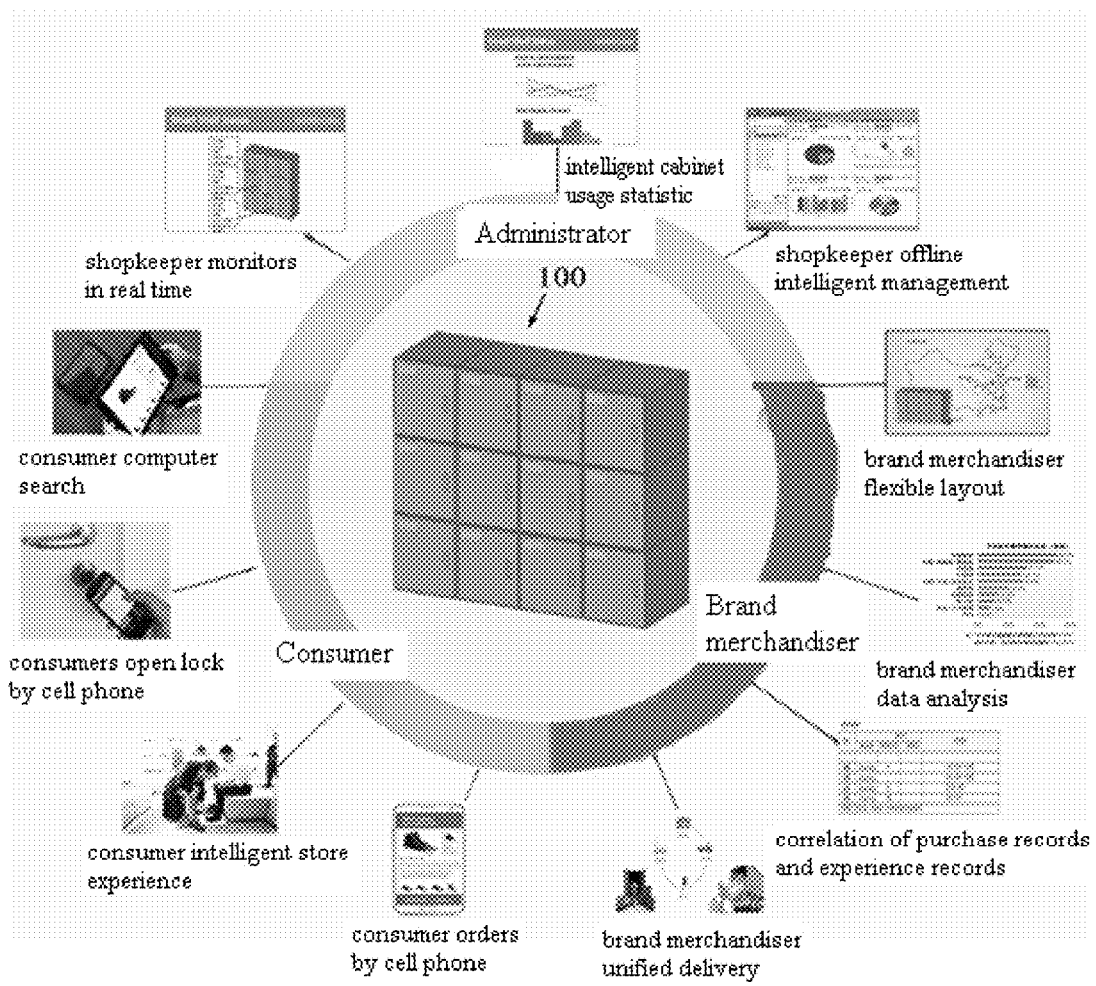
FIG. 11 shows the role and benefit of the consumer, administrator, and the brand merchandiser in the RFID intelligent display system.

As can be seen from FIG. 11, through the RFID intelligent display system of the present application:

the consumer can search the location (experience store, cabinet number) of the product of interest in real time, use intelligent terminal to open intelligent cabinet in an experience store and obtain the goods for self-serve experience, and make online purchase of the product after the experience;

the manager can monitor the operation of the intelligent cabinet in real time, remotely manage, carry out statistics in real time and generate the necessary report forms;

the brand merchandiser can flexibly set up the experience store, collect consumers' experience data and carry out analysis and decision making, use the experience information and online transaction records to formulate a profit sharing scheme with the same management and delivery.

Figure 12:
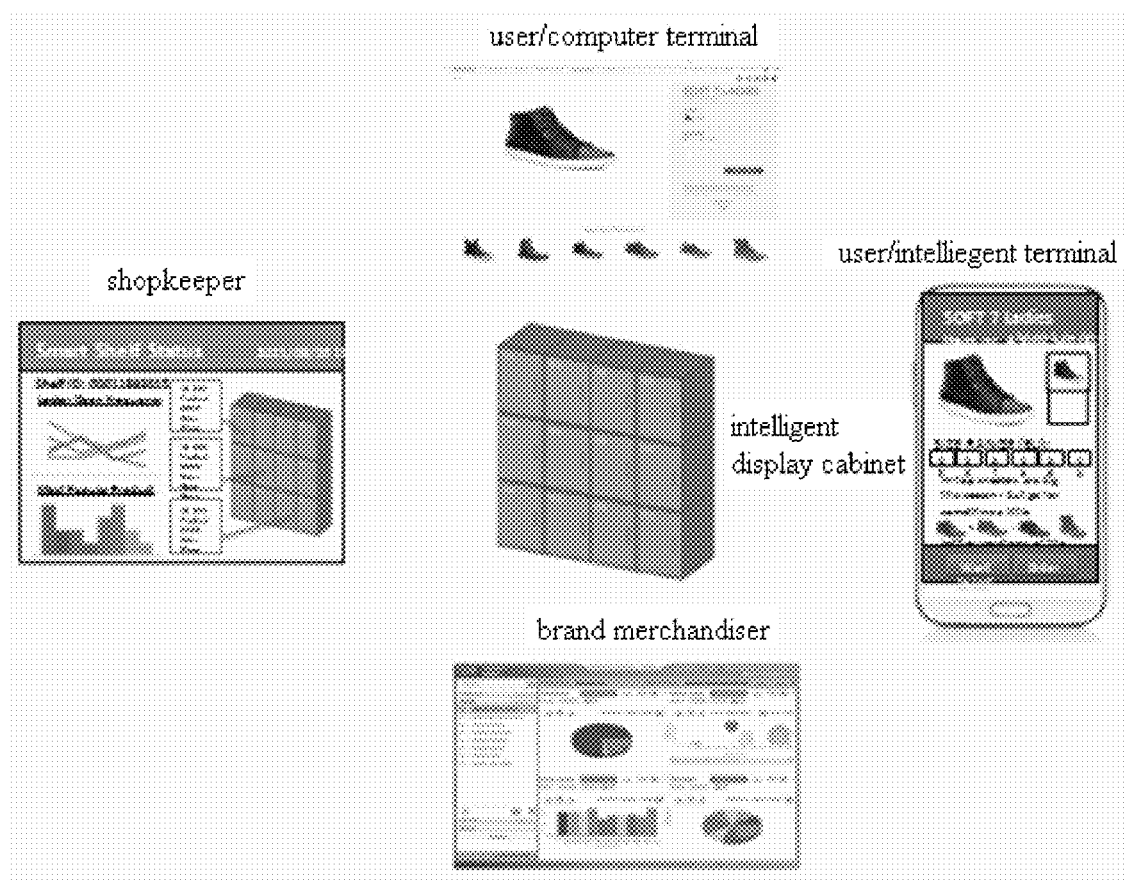
FIG. 12 is an illustrative diagram of the application of the intelligent display system in shoes industry.

Main functions of the RFID intelligent display system:
1) Administrator monitors in real time
2) Consumer makes inquiry/order online in real time
3) Consumer makes inquiry/order using cell phone
4) Consumer open/close the cabinet lock using cell phone
5) Brand merchandiser obtains experience data
6) Brand merchandiser advertisement, promotion channel Main advantages of the RFID intelligent display system:
1) Brand merchandisers can monitor all goods in the intelligent cabinet efficiently and in real time
2) Consumer can make inquiry online about goods information and location of experience store with the goods
3) Consumer can targetedly experience goods in nearby experience store
4) Consumer can realize self-serve experience
5) Experience store can realize unattended intelligent management
6) Consumer can make direct purchase online after satisfied experience with the product
7) Brand merchandiser can obtain experience data of consumers
8) Brand merchandiser can obtain experience stores' contribution based on experience data and online purchase data and formulate commission scheme FIG. 12 is an illustrative diagram of the application of the RFID intelligent display system in shoes industry.

"Only a foot knows whether a shoe fits or not" is a principle known to all. Different brands of shoes have different sizes and styles. How could one know if they fit without trying them on? Therefore, some online consumers will buy first, try later, and return if they do not fit. This wastes social resources and increase purchasing cost.

Some consumers will go to a physical store to try out the shoes first, and then order online. This renders physical stores become empty shells which exist in name only. However, the use of the intelligent display system of the present application can help shoes brands and operators to start an innovative marketing system to satisfy consumers' need and realize the real O2O (Dual O2O) mode.

Referring to FIG. 12, one can see that the intelligent display system can closely link the brand merchandisers, administrator, and consumers together on one platform, and allow them to perform their duties and get what they need, resulting in transparency of information, self-serving experience, and intelligentized operation.

Apart from perfectly applying the intelligent display system in O2O shoe industry, the system can also be applied to goods that require experiencing of their effect, such as various bags, hats, clothing, sunglasses, and even decorations, etc.

Apart from using the intelligent display system in intelligent self-serve experience mode, it can further be combined with QR code/NFC payment system so as to achieve unattended, self-serving selling mode.

The size of each intelligent shelf in the intelligent display system can be arranged according to requirement. A number of similar products can be put in the same shelf as long as each item is embedded with its RFID label.

The realization of the intelligent display system is not limited to the use of RFID technology, it can use any technology that can carry out goods recognition and automatic collection, such as image recognition, and other wireless communication technology.

The intelligent display system can also be used in safe cabinet, file cabinet, storage cabinet to realize real time monitoring, visualized and intelligent management.

Specific embodiments have been described above with reference to the accompanying drawings. However, the present application is not limited to the above specific embodiments. The above specific embodiments are merely illustrative and should not be considered as limiting. It should be noted that, upon reading the above disclosure, a person skilled in the art can make various other changes or modifications without departing from the scope of the appended claims.

What is claimed is:

1. An intelligent display system, at least comprising an intelligent display cabinet and a server connected with the intelligent display cabinet;
    the intelligent display cabinet comprising a plurality of shelf units for placing therein display products, each of the shelf units comprising:
    a control module connected with the server;
    a product-sensing module connected with the control module for sensing the putting in and taking out of the display products and obtaining information on the display products;
    an electronic lock connected with the control module for opening or closing of a cabinet door of each shelf unit according to a command of the control module; and
    a display screen provided on the cabinet door of each shelf unit and connected with the control module.

2. The intelligent display system as claimed in claim 1, wherein the product-sensing module is an electronic label reader, camera, or barcode recognition device.

3. The intelligent display system as claimed in claim 2, wherein the electronic label reader is a radio frequency identification (RFID) reader.

4. The intelligent display system as claimed in claim 1, wherein the display screen comprises a touch display screen.

5. The intelligent display system as claimed in claim 1, wherein the shelf unit further comprises a user recognition module which is connected with the control module.

6. The intelligent display system as claimed in claim 5, wherein the user recognition module is a near field communication (NFC) reader.

7. The intelligent display system as claimed in claim 1, wherein the shelf unit further comprises an input device provided on the cabinet door, the input device being connected with the control module.

8. The intelligent display system as claimed in claim 7, wherein the input device is a barcode recognition device, fingerprint recognition device or keyboard.

9. The intelligent display system as claimed in claim 1, wherein the control module is a circuit board provided with a microcontroller or microprocessor.

10. The intelligent display system as claimed in claim 5, wherein the user recognition module is a NFC label.

11. An intelligent display method, comprising:
    providing an intelligent display cabinet comprising a plurality of shelf units for placing therein display products for users to experience, each shelf unit comprising a control module, a product-sensing module, an electronic lock, and a display screen;
    obtaining information on a display product put into a shelf unit of the plurality of shelf units by the control module through the product-sensing module of the shelf unit;
    sending information on the display product and information on the corresponding shelf unit to a server by the control module;
    linking together the information on the display product and the information on the corresponding shelf unit by the server, and marking the status of the display product as online;
    displaying the information on the display product on the display screen of the shelf unit;
    carrying out verification of identification information of a user when the server receives a request for experience transmitted from the user;
    controlling the electronic lock of the shelf unit and opening of a cabinet door of the shelf unit by the control module after verification of the identification information of the user; and
    controlling the electronic lock of the shelf unit and closing of the cabinet door of the shelf unit by the control module, after the product-sensing module of the shelf unit senses that the display product is put back in the shelf unit.

12. The intelligent display method as claimed in claim 11, wherein after verification of the identification information of the user, the opening of the cabinet door of the shelf unit by the electronic lock of the shelf unit comprises:
    marking the status of the display product as offline by the server, after the product-sensing module of the shelf unit senses that the display product is taken out from the shelf unit.

13. The intelligent display method as claimed in claim 12, wherein after the product-sensing module of the shelf unit senses that the display product is put back into the shelf unit, the closing of the cabinet door of the shelf unit by the electronic lock of the shelf unit comprises:
    determining whether the display product put back into the shelf unit is the same as the display product taken out earlier;
    if it is the same, the electronic lock of the shelf unit closes the cabinet door of the shelf unit, and the server marks the status of the display product as online; and
    if it is not the same, then the shelf unit or the server sends a reminder to the user to remind the user to put the display product back in the shelf unit.

14. The intelligent display method as claimed in claim 11, wherein the product-sensing module is an electronic label reader, camera, or barcode recognition device.

15. The intelligent display method as claimed in claim 11, wherein the product-sensing module is a RFID reader, and a RFID label is provided on the display product.

16. The intelligent display method as claimed in claim 11, wherein when the server receives the request for experience transmitted from the user, verification of the identification information of the user comprises:

providing a user recognition module on the shelf unit, the user recognition module being a NFC reader, and transmitting the request for experience from the user to the server by bringing an intelligent terminal with NFC function close to and read by the NFC reader.

17. The intelligent display method as claimed in claim 11, wherein when the server receives the request for experience transmitted from the user, verification of the identification information of the user comprises:

transmitting the request for experience from the user to the server by scanning a recognition code displayed on the display screen through the use of an intelligent terminal.

18. The intelligent display method as claimed in claim 11, wherein after the identification information of the user passes the verification, the opening of the cabinet door of the shelf unit by the electronic lock of the shelf unit comprises:

after the identification information of the user passes the verification, reverting a verification code to an intelligent terminal of the user by the server, and rendering the electronic lock to open the cabinet door of the shelf unit through entering the verification code into the shelf unit by the user.

19. The intelligent display method as claimed in claim 11, wherein the information on the shelf unit at least comprises geographic location information.

20. The intelligent display method as claimed in claim 11, wherein when the server receives the request for experience transmitted from the user, verification of the identification information of the user comprises:

providing a user recognition module on the shelf unit, the user recognition module being a NFC label, and transmitting the request for experience from the user to the server by bringing an intelligent terminal with NFC function close to and read the NFC label.

* * * * *